(12) United States Patent
Kathol

(10) Patent No.: US 6,583,615 B1
(45) Date of Patent: Jun. 24, 2003

(54) MAGNETOSTRICTIVE SENSOR DEVICE HAVING ONE INTERFACE PROVIDING INFORMATION REGARDING MODE CONVERTER SIGNAL VOLATAGE AND SENSED OBJECT POSITION

(75) Inventor: Meinolf Kathol, Finnentrop (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/631,216

(22) Filed: Aug. 3, 2000

(30) Foreign Application Priority Data

Aug. 5, 1999 (DE) .......................... 199 36 970

(51) Int. Cl.$^7$ .................. G01B 7/00; G01B 7/14; G01B 17/00
(52) U.S. Cl. ................. 324/207.13; 324/207.12; 324/207.24
(58) Field of Search ............... 324/207.12, 207.13, 324/207.22, 207.24; 73/290 R, 313, 314, 290 V; 367/98, 900, 908

(56) References Cited

U.S. PATENT DOCUMENTS

| | | | | |
|---|---|---|---|---|
| 4,721,902 A | * | 1/1988 | Tellerman et al. | 324/207.13 |
| 5,334,933 A | | 8/1994 | Tellerman | |
| 5,923,164 A | * | 7/1999 | Ehling et al. | 324/207.13 |

* cited by examiner

Primary Examiner—Gerard R. Strecker
(74) Attorney, Agent, or Firm—Brooks & Kushman P.C.

(57) ABSTRACT

A sensor device for detecting a physical measurement variable is proposed including a sensor module as well as an electronic circuit module, wherein each value of the measurement variable is determined by comparison of an electrical voltage signal generated in the sensor module with a reference voltage generated in the circuit module and each value is output as a digital or analog coded signal at an output. Such a sensor device should solve the technical problem of making information about the amplitude of an internal electrical voltage signal accessible at all times for evaluation of the current tolerance situation. This is achieved in that the amplitude of this electrical voltage signal is represented by the period of a delay between the activation of the supply voltage for the sensor device and the output of the first valid measurement value.

9 Claims, 1 Drawing Sheet

MAGNETOSTRICTIVE SENSOR DEVICE HAVING ONE INTERFACE PROVIDING INFORMATION REGARDING MODE CONVERTER SIGNAL VOLATAGE AND SENSED OBJECT POSITION

TECHNICAL FIELD

The invention pertains to a sensor device for detecting a physical measurement variable including a sensor module as well as an electronic circuit module, wherein each value of the measurement variable is determined by comparison of an electrical voltage signal generated in the sensor module with a reference voltage generated in the circuit module and each value is output as a digital or analog coded signal at an output.

BACKGROUND ART

More specifically, the invention pertains to a magnetostrictive length measurement device that is described, e.g., in U.S. Pat. No. 5,334,933. This length measurement device essentially consists of an elongated, acoustic delay line containing a ferromagnetic material exhibiting a magnetostrictive effect, a sensor head at one end of this line that contains the measurement electronics and the evaluation electronics, and a permanent magnet that can be shifted along the line.

The length measurement is achieved by determining the position of the permanent magnet along the delay line relative to the sensor head.

In this way an electrical current pulse is induced in this delay line and simultaneously a time measurement is started. The magnetic field caused by this current pulse interacts with the magnetic field at the location of the permanent magnet in such a way that at that point a voltage state in the delay line is generated in the form of an acoustic torsional pulse that is transmitted along the delay line at the speed of sound that is typical for the material. The acoustic torsional pulse is converted into an equivalent electrical signal in the sensor head and when it exceeds a reference value, an output signal is generated that ends the time measurement.

The determined time is proportional to the length to be measured so that the desired measurement result can be output in digital or analog coded form by the electronics of the sensor head.

Since the amplitude of the torsional pulse and thus also the electrical signal generated in the sensor head by means of this pulse becomes smaller with increased measured length, it is necessary to adjust the threshold value of the comparator, e.g., as described in the cited patent.

However, the amplitude of the electrical signal is also subject to other influencing factors, wherein the ambient temperature plays an important role, so that for the evaluation of the tolerance position of the total system, particularly in view of a sufficient signal to noise margin, the knowledge of the absolute amplitude of the electrical signal is required. However, access to this information with sensor devices of the type used at the present time is not possible.

SUMMARY OF THE INVENTION

The task of the present invention is to refine the sensor device of the described art such that information about the amplitude of the internal electrical signal is accessible for the evaluation of the current tolerance situation at all times without requiring an additional interface.

This is achieved in that the amplitude of this electrical signal is represented by the period of the delay between the activation of the supply voltage for the sensor device and the output of the first valid measurement value.

In addition, the task of the present invention is to provide a method for use that can execute simple and fast function testing of such a sensor device.

This is achieved in that the amplitude of the electrical voltage signal generated in the sensor module that is determined by the period of the delay is used for the evaluation of the tolerance situation of the sensor device as well as the output of a good-bad decision in particular.

BRIEF DESCRIPTION OF THE DRAWINGS

Additional configurations and advantageous refinements according to the invention are specified in the subordinate claim and are also presented in the following description of the embodiments shown in the drawings.

DETAILED DESCRIPTION OF THE PREFERRED EMBODIMENT(S)

Figure 1:
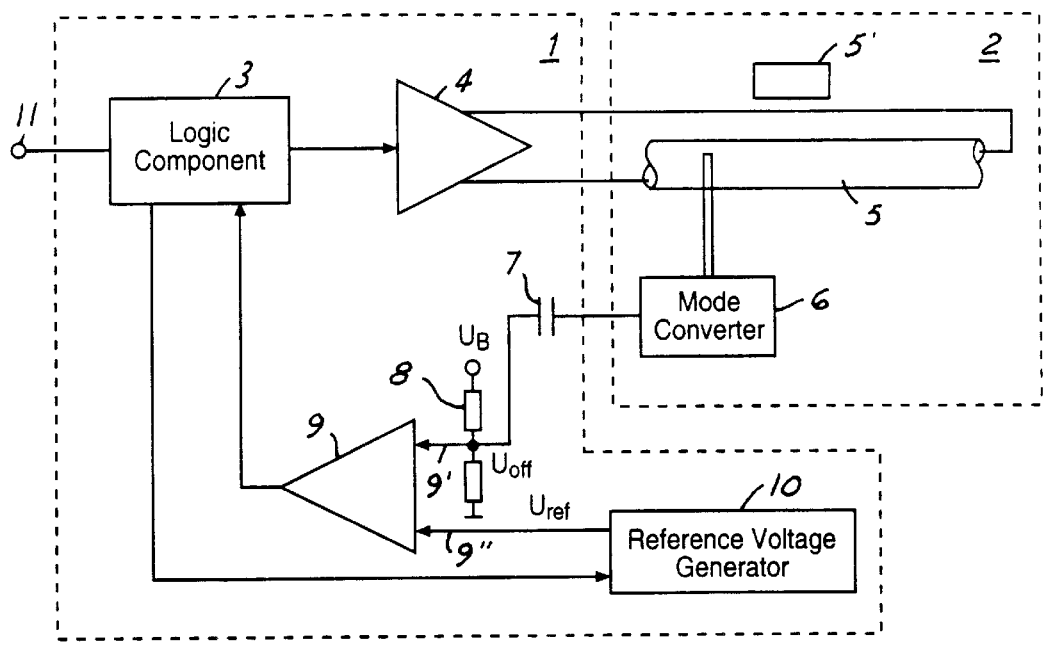
FIG. 1 is a schematic representation of a magnetostrictive length measurement device refined according to the invention.

The magnetostrictive length measurement device shown in FIG. 1 is controlled by a logic component 3 that is part of the circuit module 1 and that performs various control and measurement functions. At the beginning of each individual length measurement, the logic component 3 causes the pulse generator 4 to induce a current pulse in the ferromagnetic delay line 5. The ferromagnetic delay line 5, together with the permanent magnet 5' and the mode converter 6, forms the sensor module 2. The magnetic field induced by the current pulse interacts with the magnetic field at the location of the permanent magnet 5', wherein a mechanical torsional pulse emanating from this point of interaction is started in the delay line 5. When this mechanical torsional pulse reaches the location of the mode converter 6, it is transformed by this converter into an equivalent electrical voltage signal that is capacitively coupled by the capacitor 7 with the offset voltage Uoff from a voltage divider 8 at the input 9' of a comparator 9. On the other input 9" of the comparator 9 is a reference voltage Uref that is supplied from a reference voltage generator 10 and that is changeable by means of the logic component 3 (for the definition of Uoff and Uref, see also the example represented in FIG. 2). If the amplitude of the output signal of the mode converter 6 is greater than or equal to the difference between the offset voltage Uoff and the reference voltage Uref, the peak voltage of the voltage on the input 9' does not reach the reference voltage Uref, and the comparator 9 outputs a signal to the logic component 3 that ends the time measurement started by the generation of the current pulse. A pulse-width modulated signal at a fixed frequency, and with a pulse duty factor encoded with the measured time, is output at the output 11 of the circuit module 1.

In order to make the level of the required reference voltage Uref and thus the amplitude of the pulse-shaped, electrical output signal of the mode converter 6 detectable to the outside over the existing output interface 11 of the circuit module 1, the reference voltage generator 10 is controlled such that after the activation of the sensor device by means of the logic component 3 at the same time as the start of the first time measurement, the reference voltage Uref on input 9″ of the comparator 9 is increased according to a known time function from a fixed starting value that is clearly below the typically required value for operation. The rise time of this voltage, which can have, for example, a linear or logarithmic profile over time, is selected such that until the first value leading to a valid answer signal is achieved, multiple current pulses are started in its profile.

Figure 2:
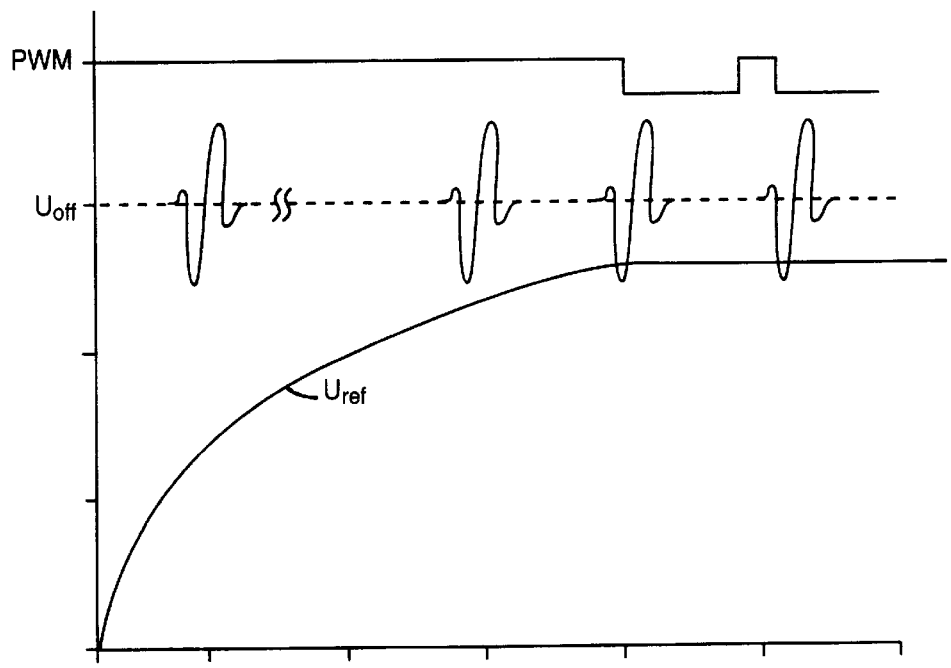
FIG. 2, the timing diagram of the pulse-shaped voltage signal and the pulse-width modulated output signal PWM, as well as an example reference voltage Uref.

In FIG. 2, the input voltages of the inputs 9′ and 9″ of the comparator 9, as well as the pulse-width modulated output signal PWM at the output 11 of the circuit module 1, are shown schematically as a function of time, wherein the relationships of the time profiles of the pulse-shaped voltage signals and the pulse-width modulated output signal are represented on extremely expanded time scales relative to the logarithmic scale of the reference voltage curve Uref. Actually, there are approximately 40 to 100 generated voltage pulses between the starting point of the reference voltage curve Uref and the first intersection point with a voltage pulse. When the reference voltage Uref reaches a value that falls below the peak amplitude of the pulse-shaped voltage signal for the first time, the comparator 9 switches for the first time. The logic component 3 outputs the first transition edge by means of the output 11 and causes the reference voltage generator 10 to maintain the current reference voltage value Uref. By means of the next pulse-shaped voltage signal, the first regular measurement cycle is completed and by means of the duty factor determined by both of the further edge transitions in the output signal, the first valid measurement value is output.

From the total time between the activation of the supply voltage or the start of the first current pulse by the pulse generator 4 until the output of the first valid measurement value at the output 11 of the circuit module 1, the current value of the voltage and thus at the same time also the amplitude of the voltage signal generated in the sensor module 2 can be determined with reference to the known voltage-time profile of the reference voltage Uref by means of, e.g., an external testing device.

What is claimed is:

1. A magnetostrictive sensor device comprising:
   a delay line;
   a pulse generator coupled to the delay line for periodically generating electrical current pulses in the delay line from an initial starting time;
   a magnet located proximate the delay line for converting the current pulses propagating in the delay line into acoustic pulses propagating in the delay line;
   a mode converter coupled to the delay line for detecting the acoustic pulses and converting the acoustic pulses into corresponding mode converter signals, each having an electrical voltage indicative of the corresponding acoustic pulse;
   a reference voltage signal generator for generating a reference voltage signal having an electrical voltage which increases in accordance with a known function over time from the initial starting time;
   a comparator coupled to the mode converter and the reference voltage signal generator for comparing each mode converter signal to the reference voltage signal, wherein the comparator switches when the voltage of a mode converter signal at a given time after the initial starting time becomes equal to the voltage of the reference voltage signal, wherein the comparator switches a second time when the voltage of the next mode converter signal occurring after the given time is equal to the voltage of the reference voltage signal; and
   a logic component coupled to the comparator and the reference voltage generator, wherein the logic component causes the reference voltage generator to maintain the voltage of the reference voltage signal upon the comparator switching at the given time, the logic component being operable for, upon the comparator switching the second time, outputting an output signal indicative of the given time and the time period between the mode converter signal at the given time and the next succeeding mode converter signal occurring after the given time;
   wherein the voltage of the mode converter signal at the given time is determined using the known function and the given time indication provided by the output signal.

2. The sensor device of claim 1 wherein:
   the position of the magnet with respect to the delay line is determined from the output signal as a function of the time period between the mode converter signal at the given time and the next succeeding mode converter signal occurring after the given time.

3. The sensor device of claim 1 wherein:
   the voltage of the reference voltage signal increases linearly over time.

4. The sensor device of claim 1 wherein:
   the voltage of the reference voltage signal increases over time in accordance with a logarithmic function.

5. The sensor device of claim 1 wherein:
   the comparator generates a pulse-width modulated signal after switching.

6. The sensor device of claim 1 wherein:
   the comparator generates a coded analog voltage signal after switching.

7. The sensor device of claim 1 wherein:
   the delay line is a ferromagnetic delay line.

8. The sensor device of claim 1 wherein:
   the magnet is a permanent magnet.

9. A method for use with a magnetostrictive sensor device, the method comprising:
   coupling a pulse generator to a delay line for periodically generating electrical current pulses in the delay line from an initial starting time;
   locating a magnet proximate the delay line for converting the current pulses propagating in the delay line into an acoustic pulses propagating in the delay line;
   detecting the acoustic pulses and converting the acoustic pulses into corresponding mode converter signals each having an electrical voltage indicative of the corresponding acoustic pulse;
   generating a reference voltage signal having an electrical voltage which increases in accordance with a known function over time from the initial starting time;
   comparing each mode converter signal to the reference voltage signal;
   generating a switch signal when the voltage of a mode converter signal at a given time after the initial starting time becomes equal to the voltage of the reference voltage signal;
   generating a second switch signal when the voltage of the next mode converter signal occurring after the given time is equal to the voltage of the reference signal;
   causing the voltage of the reference voltage signal to be maintained upon the generation of the switch signal at the given time;

upon the generation of the second switch signal, outputting an output signal indicative of the given time and the time period between the mode converter signal at the given time and the next succeeding mode converter signal occurring after the given time; and determining the voltage of the mode converter signal at the given time using the known function and the given time indication provided by the output signal.

* * * * *